United States Patent [19]

Tsunoda

[11] Patent Number: 4,737,986
[45] Date of Patent: Apr. 12, 1988

[54] SUBSCRIBER'S LINE CLOSING CIRCUIT

[75] Inventor: Yuzuru Tsunoda, Koganei, Japan

[73] Assignee: Iwatsu Electric Co., Ltd., Tokyo, Japan

[21] Appl. No.: 24,861

[22] Filed: Mar. 12, 1987

Related U.S. Application Data

[63] Continuation of Ser. No. 693,797, Jan. 23, 1985, abandoned.

[30] Foreign Application Priority Data

Jan. 24, 1984 [JP] Japan .................................. 59-9492

[51] Int. Cl.$^4$ ............................................. H04M 3/22
[52] U.S. Cl. ................................... 379/373; 379/379; 379/382
[58] Field of Search ............... 379/377, 382, 418, 379, 379/372, 373, 376, 383, 396, 236

[56] References Cited

U.S. PATENT DOCUMENTS 4,326,104  4/1982  Bergida .............................. 379/379
4,495,494  1/1985  McCune ........................ 340/825.06

FOREIGN PATENT DOCUMENTS 2801105  7/1978  Fed. Rep. of Germany ........ 179/18 FA
1561392  2/1980  United Kingdom ........... 179/18 FA

OTHER PUBLICATIONS

"Control Circuit for Applying Ringing Voltage to Distinct Line Circuits", S. D. Samuels, Western Electric Technical Digest, No. 65, Jan. 1982, pp. 23-24.
"Telephone on/off Hook Detector", C. B. Glowienku et al., IBM Technical Disclosure Bulletin, vol. 16, No. 5, Oct. 1973, pp. 1558-1559.

Primary Examiner—Jin F. Ng
Assistant Examiner—R. Vaas
Attorney, Agent, or Firm—Emmanuel J. Lobato; Robert E. Burns

[57] ABSTRACT

A subscriber's line closing circuit, in which at least one first photo coupler and at least one second photo coupler connected in parallel but in reverse polarities are inserted in a closing loop so as to detect an incoming call, to form a DC Loop and to sense the direction of a direct current flowing through the closing loop.

4 Claims, 6 Drawing Sheets

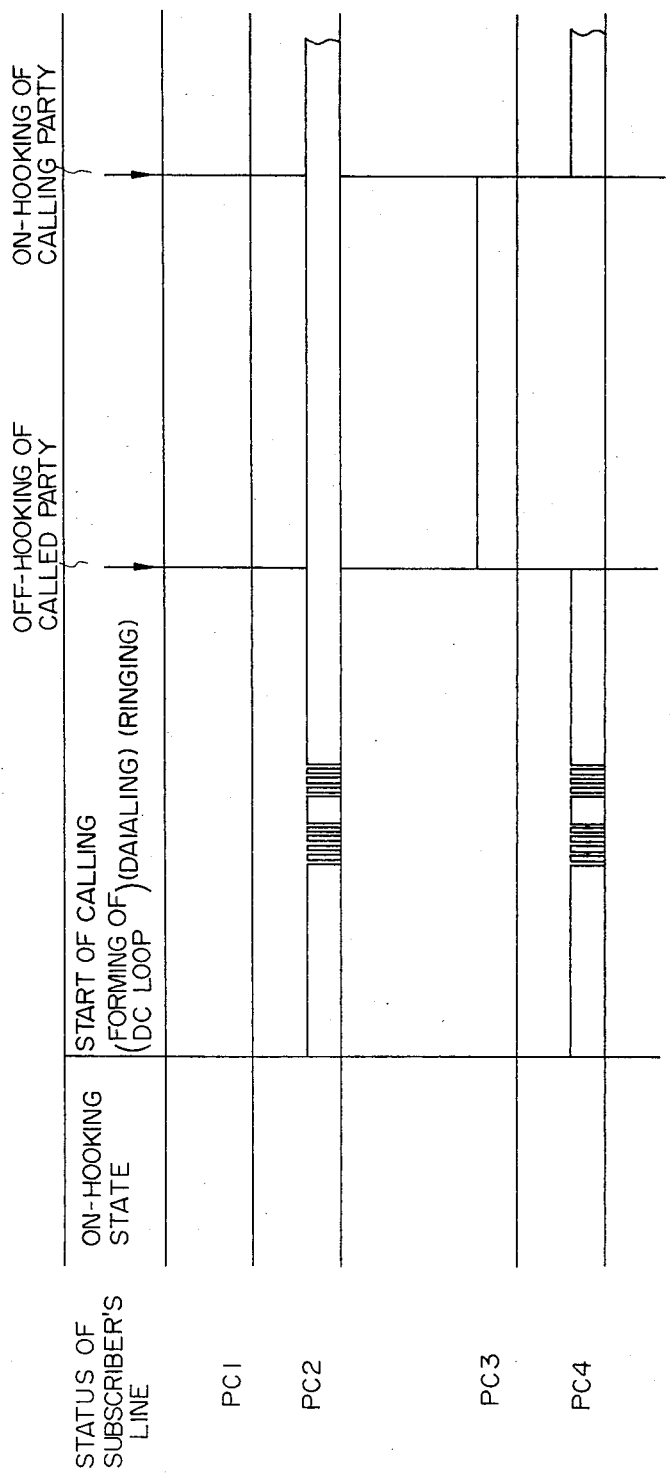

SUBSCRIBER'S LINE CLOSING CIRCUIT

This is a continuation of our copending application Ser. No. 693,797 filed Jan. 23, 1985, now abandoned.

BACKGROUND OF THE INVENTION

The present invention relates to a loop closing circuit for detecting a ringing signal, forming a DC loop circuit and sending dial signals (such as dial pulses or multi-frequency signals) in an instrument which is connected to a subscriber's line of an exchange.

Conventional circuits of this type have photo couplers individually provided for an incoming call detecting operation and for an office loop current detecting operation.

What is intended to mean by the "photo coupler" herein mentioned is one that employs a light emitting diode as a light emitting element and a photo transistor, a photo thyristor or the like as a light receiving element. The light emitting diode used as a light emitting element emits light only when a current flows therethrough in a forward direction, and when it is put to use, it is essential to supply a current in the forward direction. In general, the light emitting diode is readily broken by a relatively low reverse voltage, and when flows therein a reverse current, it does not emit light, and hence does not performs the function of a photo coupler. Moreover, conventional circuits is defective in that the number of parts used is relatively large as will be seen from the below description.

SUMMARY OF THE INVENTION

It is an object of the present invention to provide a subscriber's line closing circuit which is characterized in that the number of parts used is small and that photo couplers connected in parallel but in reverse polarities are inserted in a closing loop circuit, thereby permitting economization of the circuit arrangement and achieving high reliability of information on the subscriber's line.

To attain the above object of the present invention, there is provided a subscriber's line closing circuit, characterized in that at least one first photo coupler and at least one second photo coupler, connected in parallel but in reverse polarities, are inserted in a closing loop so as to detect an incoming call, to form a DC loop and to sense the direction of direct current.

BRIEF DESCRIPTION OF THE DRAWINGS

The present invention will be described in detail below in comparison with conventional art with reference to the accompanying drawings, in which:

FIGS. 3 and 4 are timing charts showing the operating states of photo couplers in the circuits of FIGS. 1 and 2; and FIGS. 5A, 5B, 5C, 5D and 6 are circuit diagrams showing another embodiment of the present invention.

DETAILED DESCRIPTION

Figure 1:
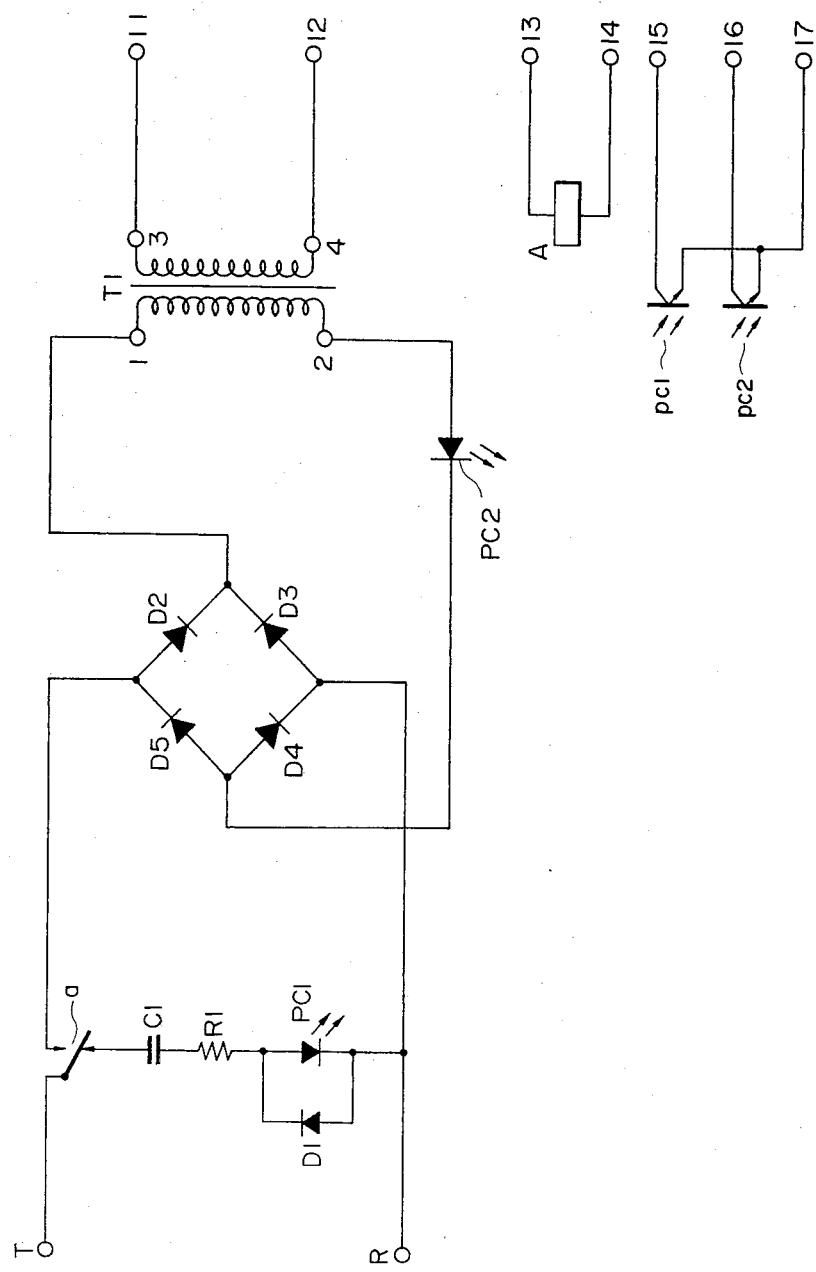
FIG. 1 is a circuit diagram illustrating an example of a conventional closing circuit.

To make differences between conventional art and the present invention clear, an example of the prior art closing circuits is illustrated with reference to FIG. 1. Reference numerals and present invention clear, an example of the prior art will first be described with reference to FIG. 1. Reference numerals and indicate terminals to which a subscriber's line of an exchange is connected. Reference character A designates a relay coil, by which a contact a is driven. The contact a is normally held on the side of a capacitor C1. The capacitor C1 inhibits the passage therethrough of direct current from the exchange but permits the passage therethrough of a ringing signal as of 16 Hz. Reference R1 identifies a resistor which is used, in combination with the capacitor C1, to form an appropriate impedance against the ringing signal from the exchange and to limit a current flowing across a photo coupler PC1. Of course, the resistor R1 is unnecessary when only the capacitor C1 suffices.

References PC1 and PC2 denote light emitting diodes, and pc1 and pc2 represent light receiving transistors. The light emitting diodes PC1 and PC2 respectively pair with the transistors pc1 and pc2, forming photo couplers. Usually, the light emitting diode PC1 is used for detecting an incoming call and the light emitting diode PC2 for detecting the presence or absence of a DC loop circuit. Reference D1 indicates a diode, which is connected in parallel to the light emitting diode PC1 in a polarity reverse therefrom. Since the ringing signal from the exchange is an AC signal of 16 Hz, a reverse voltage may sometimes be applied to the light emitting diode PC1. Since the light emitting diode is readily broken by the reverse voltage, as mentioned previously, the diode D1 is employed for protecting the light emitting diode from the reverse voltage. References D2, D3, D4 and D5 designate diodes, which form a bridge circuit. This is intended for fixing the direction of a current flowing through the light emitting diode PC2 of the photo coupler.

Incidentally, it is considered that it is also possible to connect a diode in parallel to the light emitting diode PC2 in the polarity therefrom instead of using the diode bridge as is the case with the light emitting diode PC1, but the DC loop cannot be detected by such a circuit arrangement. The reason for this is that the light emitting diodes PC1 and PC2 are protected from the reverse voltage but do not emit light on the reverse voltage. It is also considered that the diode bridge would be unnecessary if the polarity of a current from the subscriber of the exchange could be predetected. However, this is not practical for the following reasons:

Firstly, the subscriber's line of the exchange has many connections from the exchange to the terminals T and R of this closing circuit, and its polarity does not always remain fixed while it is used.

Secondly, according to the system of exchange, there is a device which inverts its polarity in response to a status change such as answering operation from a called party after forming a DC loop circuit by the closing circuit.

Reference character T1 indicates a transformer. This example is shown to terminate with the transformer. Reference numerals 11, 12, ... 16 and 17 identify terminals, which are connected to a device which controls the closing circuit. The terminals 11 and 12 are used for communication or the like; for example, if such a device is an exchange, a telephone set is connected via a channel switch, and in case of a data transmission device, an oscillation circuit or receiving circuit for a frequency of voice band. The terminals 13 and 14 are coil terminals of a relay A, and the terminals 15, 16 and 17 are terminals for taking out the outputs of the light receiving transistors pc1 and pc2. These terminals are connected, for instance, to a control circuit of the device, transmitting various information. In general, the output of the light receiving transistor pc1 derived from the terminals 15 and 17 is preferred to as incoming information and the output of the transistor pc2 across the terminals 16 and 17 is called loop information.

Next, a description will be given of the operation of this circuit.

Upon arrival of a ringing signal from the exchange during an ON-hook state, the ringing signal flows in a route (1) [T, a, C1, R1, PC1, R]; or a route (2) [R, D1, R1, C1, a, T]. In the case of the route (1), incoming information detected by the light emitting diode PC1 is applied via the light receiving transistor pc1 to the device.

The formation of a DC loop will be described next. In the abovesaid holding state, the relay A is activated to switch the contact a from the capacitor C1 to the diode D2. A direct current from the exchange flows in a route (3) [T, a, D2, winding of the transformer T1 between the terminals 1 and 2, PC2, D4, R], or a route (4) [R, D3, winding of the terminal T1 between the terminals 1 and 2, PC2, D5, a, T]. In either case, a current of a fixed direction flows through the light emitting diode PC2 and information indicating the presence of the loop is transmitted from the light emitting diode PC2 via the light receiving transistor pc2 to the device.

Incidentally, the sending of dial signals is performed by intermittently forming the DC loop circuit by actuating the contact a.

This circuit is defective in that the number of parts used is relatively large, as will be seen from the illustrated circuit arrangement.

The present invention will hereinafter be described in detail.

Figure 2:
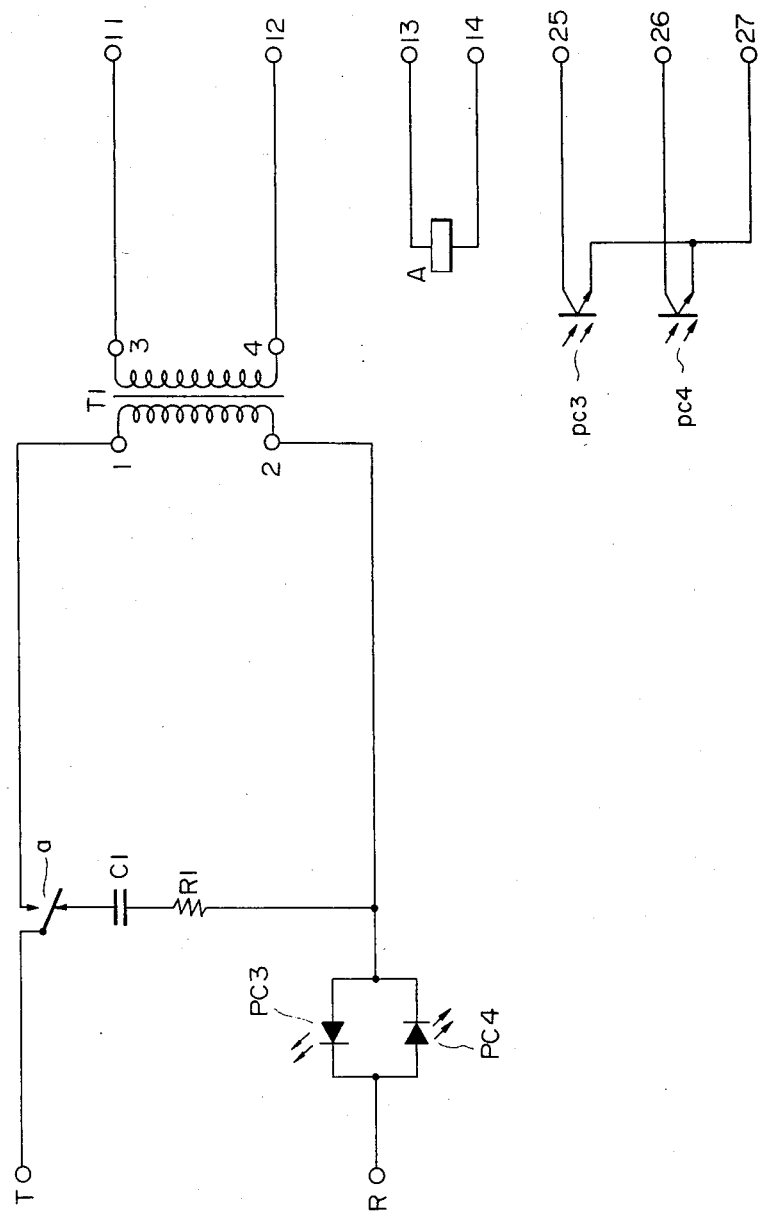
FIGS. 2 and 6 are circuit diagrams illustrating embodiments of the closing circuit of the present invention.

FIG. 2 illustrates an embodiment of the present invention. Photo couplers reversely connected in parallel are shown to be connected to the terminal R but may also be connected to the terminal T. In the case of detecting a DC loop current alone, they may be connected between the contact a and the winding of the transformer T1, or between the winding of the transformer T1 and the resistor R1. The reverse-parallel connection of the photo couplers makes it unnecessary to use an auxiliary diode and the like for protecting them from the reverse voltage.

A description will be given first of main reference numerals and characters and the purposes of elements bearing them. The parts of the same reference numerals and characters as those in FIG. 1 are of the same purpose, and no descriptions will be repeated. Reference characters PC3 and PC4 indicate light emitting diodes of the photo couplers, and pc3 and pc4 designate light receiving transistors. The light emitting diodes PC3 and PC4 form pairs with the light receiving transistors pc3 and pc4, respectively. Reference numerals 25, 26 and 27 identify terminals, from which the outputs of the light receiving transistors pc3 and pc4 are taken out. The terminals 11, 12, 13, 14, 25, 26 and 27 are connected, for example, to the control circuit of the device, transmitting thereto various information.

Next, a description will be given of the operation of the illustrated embodiment.

Upon arrival of a ringing signal from the exchange in the ON-hook state, the ringing signal flows via a route (1) [T, a, C1, R1, PC3, R], or a route (2) [R, PC4, R1, C1, a, T]. In both cases (1) and (2), incoming information is transmitted via the light receiving transistors pc3 and pc4 to the device. The formation of the DC loop circuit will be described next. In the abovesaid holding state, the relay A is activated to change over the contact a from the capacitor C1 to the terminal 1 of the transformer T1. The direct current from the exchange flows via a route (3) [T, a, winding of the transformer T1 between the terminals 1 and 2, PC3, R], or a route (4) [R, PC4, winding of the transformer T1 between the terminals 1 and 2, a, T]. In the case of the route (3), the light emitting diode PC3 emits light, and in the case of the route (4), the light emitting diode emits light, transmitting information to the device via the light receiving transistors pc3 and pc4, respectively. That is, since either one of the light emitting diodes PC3 and PC4 emits light depending upon the direction of current, the direction of current can be sensed.

Incidentally, the sending of dial signals is carried out by intermittently forming the DC loop circuit by driving the contact a in the same manner as in the case of FIG. 1.

Figure 3:
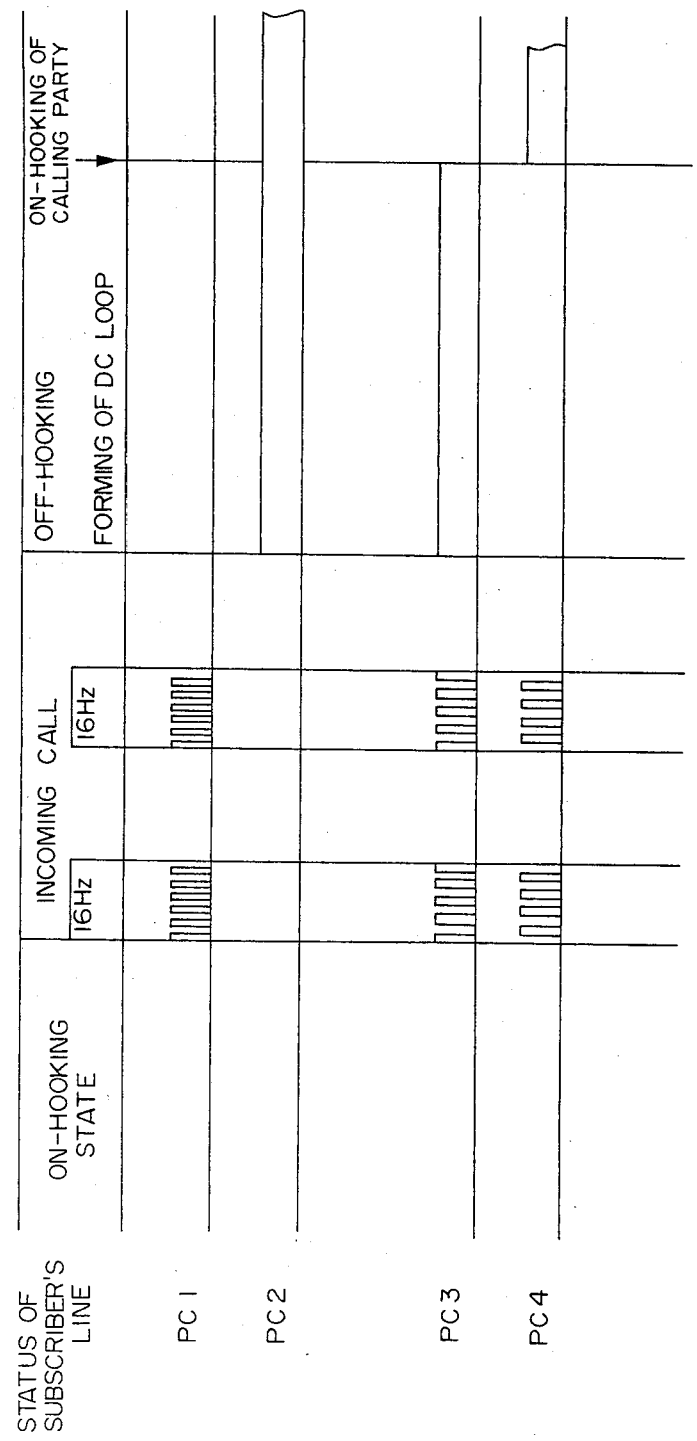

Turning next to FIGS. 3 and 4, the operations of the examples shown in FIGS. 1 and 2 will be described in comparison wtih each other.

FIG. 3 shows an example of the operation in the case of receiving an incoming call. At the time of arrival of a ringing signal of 16 Hz, only the light emitting diode PC1 is activated in the conventional example shown FIG. 1. In the embodiment shown in FIG. 2, the light emitting diodes PC3 and PC4 are activated alternately with each other. Accordingly, the embodiment of FIG. 2 permits accurate discrimination of the ringing signal.

Consider, for example, a case where the photo coupler malfunctions due to unspecified external noise or the like. In the circuit of FIG. 1, since the source of information is only the light emitting diode PC1, its erroneous output may sometimes be taken for the detected output of an incoming call, whereas in the circuit of FIG. 2 the probability of such a faulty operation is low since the two photo couplers yield outputs alternately.

Upon formation of the DC loop circuit for answering, the light emitting diode PC1 is activated in the circuit of FIG. 1. In the circuit of FIG. 2, either one of the light emitting diodes PC3 and PC4 is activated. FIG. 3 shows an example in which the light emitting diode PC3 is activated.

Next, when the calling party on-hooks first, the polarity of the subscriber's line may be inverted in some cases. With the circuit of FIG. 1, this information cannot be obtained. With the circuit of FIG. 2, this information can be obtained since the output of one of the photo couplers is switched to the output of the other. FIG. 3 shows a case in which the output is switched from the light emitting diode PC3 to the light emitting diode PC4.

FIG. 4 shows, by way of example, their calling operations. In the both circuits of FIGS. 1 and 2, the DC loop currents flow in the same direction and the photo coupler outputs are the same until dialling to call a called party after forming the DC loop by actuating the contact a for calling. With the circuit of FIG. 2, if the other photo coupler (the light emitting diode PC3 in the example of FIG. 4) produces an output in this while, it indicates the occurrence of an incoming call or some other operation.

Next, when the called party answers, the polarity of the subscriber's line is inverted according to the exchange used. In this case, the circuit of FIG. 1 cannot detect it, but in the circuit of FIG. 2, the output of the photo coupler is changed over from the light emitting diode PC3 to the light emitting diode PC4, by which the polarity inversion is detected. Furthermore, according to the exchange used, the polarity of the subscriber's line is inverted again when the called party on-hooks first. In this case, the output of the photo coupler in the circuit of FIG. 2 is switched from the light emitting diode PC4 to the light emitting diode PC3. Accordingly, these this information can be obtained by monitoring the output of the photo coupler. With the circuit of FIG. 1, the DC loop circuit can be detected but the information of the called party's answering and on-hooking cannot be obtained.

Figure 5A:
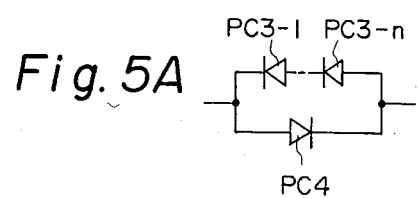
Figure 5B:
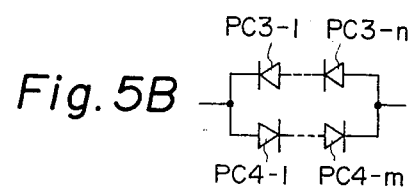
Figure 5C:
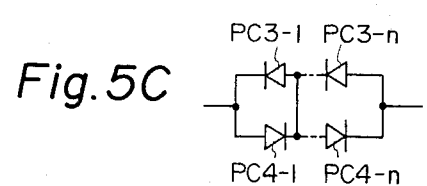
Figure 5D:
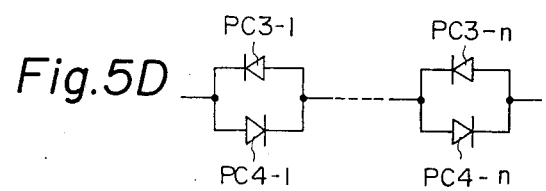

Each of the light emitting diode PC3 (the first light emitting diode) and the light emitting diode PC4 need not always be single, as shown in FIG. 2, but their numbers may also be increased, as shown in FIGS. 5A to 5D. FIG. 5A illustrates the case of using n first light emitting diodes PC3-1, . . . PC3-n connected in series and FIG. 5B the case of further using m second light emitting diodes PC4-1, . . . PC4-m. FIGS. 5C and 5D show the cases of using n pairs of first light emitting diode PC3-1 and second light emitting diode PC3-2, . . . and second light emitting diode PC3-n and second light emitting diode PC4-n, respectively connected in parallel and in reverse polarities and connected in cascade. In this way, the number of items of detection and control can be increased.

Figure 6:
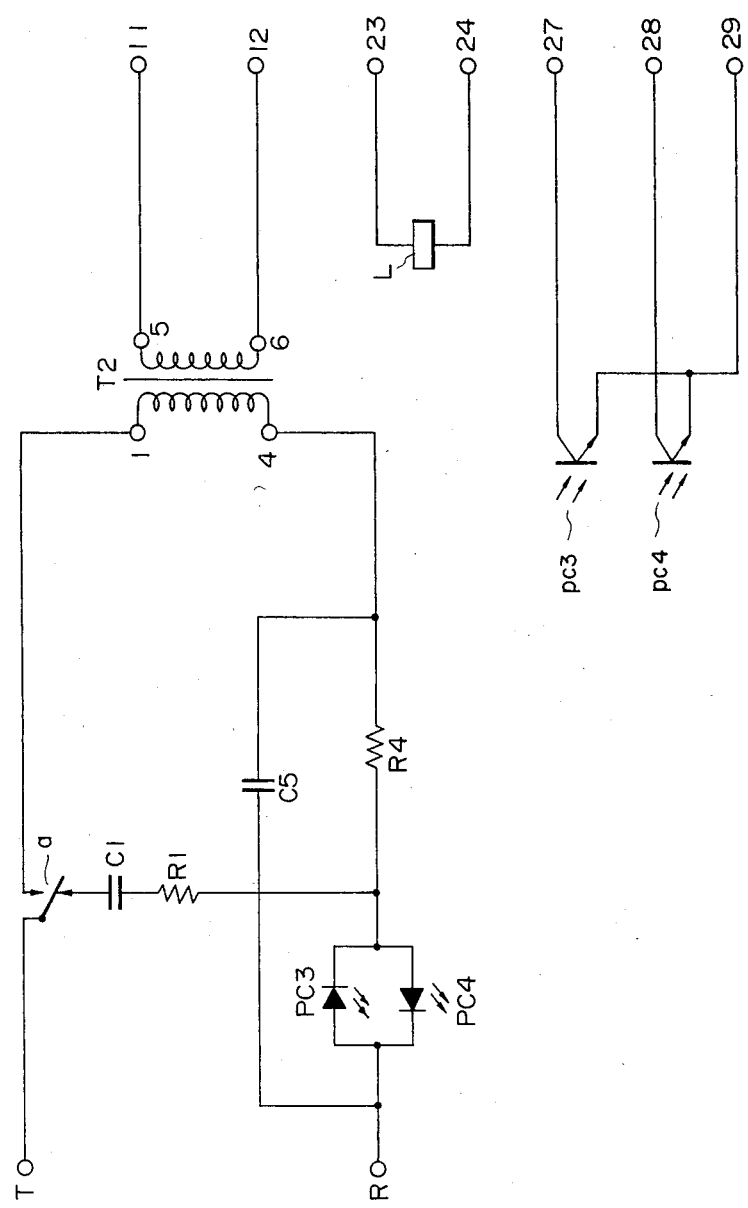

In the embodiment of FIG. 2, it is also possible to insert a resistor R4 for impedance adjustment in the DC loop circuit and to connect a capacitor C5 in parallel to the resistor R4, as shown in FIG. 6, for preventing the attenuation of a voice signal by forward currents of the light emitting diodes PC3 and PC4.

As has been described in the foregoing, according to the present invention, the diode bridge is not required, and various information of high reliability can be obtained by virtue of the temporal and mutual relationships of the photo coupler outputs.

What we claim is:

1. In a subscriber's line closing circuit comprising a closing loop, the improvement comprising a first photo coupler and a second photo coupler having respective light-emitting diodes connected in parallel but in reverse sense to each other and connected in said closing loop to detect an incoming call, to form a DC loop and to sense the direction of a direct current flowing through the closing loop, an output circuit having a pair of light-receiving transistors, said first photo coupler having one of said pair of light-receiving transistors and said second photo coupler having a second of said pair of light-receiving transistors, and means connected in parallel with said light-emitting diodes of said first photo coupler and said second photo coupler effective for preventing attenuation of voice signals by forward currents in the light-emitting diodes.

2. In a subscriber's line closing circuit comprising a closing loop, the improvement according to claim 1, in which said means connected in parallel with said light-emitting diodes comprises a capacitor.

3. In a subscriber's line closing circuit comprising a closing loop, the improvement comprising a first photo coupler and a second photo coupler each having a light-emitting diode connected to each other in parallel in a reverse sense and connected in said loop to detect an incoming call, to form a DC loop and to sense the direction of a direct current flowing through the closing loop, a pair of light-receiving transistors, said first photo coupler having one of said pair of light-receiving transistors and said second photo coupler having a second of said pair of light-receiving transistors, a separate output circuit for outputs of the light-receiving transistors and in which the pair of light-receiving transistors are connected in a reverse sense, the output circuit having three terminals for connection to a device for receiving said outputs, the pair of light-receiving transistors having a common emitter connection to a first terminal of the output circuit and separate collector connections to a second terminal and a third terminal of said three terminals, and means in said closing loop connected to said light-emitting diodes of said first photo coupler and said second photo coupler effective for preventing attenuation of voice signals by forward currents in the light-emitting diodes.

4. In a subscriber's line closing circuit comprising a closing loop, the improvement according to claim 3, in which said means comprises a capacitor in parallel with the light-emitting diodes of said first photo coupler and said second photo coupler.

* * * * *